INVENTORS.
JOHN L. ALTEKRUSE
ALBERT C. BUXTON
BY ROBERT O. HANCOCK
JAMES H. MILLER

ATTORNEY

United States Patent Office 3,421,716
Patented Jan. 14, 1969

3,421,716
VEHICLE GUIDANCE SYSTEM
John L. Altekruse, Cuyahoga Falls, Albert C. Buxton and Robert O. Hancock, Akron, and James H. Miller, North Canton, Ohio, assignors to Goodyear Aerospace Corporation, a corporation of Delaware
Filed Nov. 13, 1962, Ser. No. 238,824
U.S. Cl. 244—3.17        7 Claims
Int. Cl. F41g 7/00; F42b 15/02; G06f 15/50

The present invention relates to a system for automatically guiding vehicles such as aircraft or missiles along a selected flight path and more particularly to a system which automatically corrects the vehicle's position periodically by comparing a reference map and a sensed terrain map to produce error information which is superimposed upon a basic guidance system, such as an inertial guidance system to control the flight of the vehicle between the separate reference map check points.

It is the object of the invention to provide a reliable and flexible vehicle guidance system that is relatively small and lightweight and has high accuracy unaffected by range.

Another object of the invention is to provide a vehicle guidance system which has a minimum amount of terrain sensing operations thereby reducing the vehicle's susceptibility of being detected.

Another object of the invention is to provide a vehicle guidance system that requires a minimum amount of reconnaissance or synthetic reference map information.

Another object of the invention is to provide a vehicle guidance system that permits programmed maneuvers and evasive tactics by the vehicle between reference map check points.

Another object of the invention is to provide an inertial guidance system for vehicles that periodically dumps any accumulated errors at the reference map check points.

According to the invention, the vehicle guidance system comprises an intermittently operated map matching vehicle guidance system operatively coupled with a basic guidance system, usually an inertial vehicle guidance system. The map matching guidance system includes means to compare sensed terrain information with reference map information and produce output signals which are a function of the compared information. This comparison is made at spaced check points along the flight path of the vehicle. The output signals are used to correct the outputs of the inertial guidance system.

In the interval between the check points the vehicle is controlled by signals from the inertial guidance system. The inertial system errors are corrected at the check points by the output signals of the map matching guidance system. The application of this characteristic for navigation between check points permits an increase in the interval distance between check points without increasing the lock on tolerances of the intermittent ground referencing guidance system.

Computer means tie in the map matching and inertial guidance systems by periodically correcting the system output in accordance with the map matching system output. The computer compares the actual distance traveled by the vehicle as determined by the inertial guidance system with the programmed distance between check points. When the vehicle is over a check point the computer triggers the map matching guidance system. This operation is repeated at each check point.

The exact nature of the invention as well as other objects and advantages thereof will be readily apparent from the consideration of the following specification relating to the annexed drawing in which.

Figure 1:
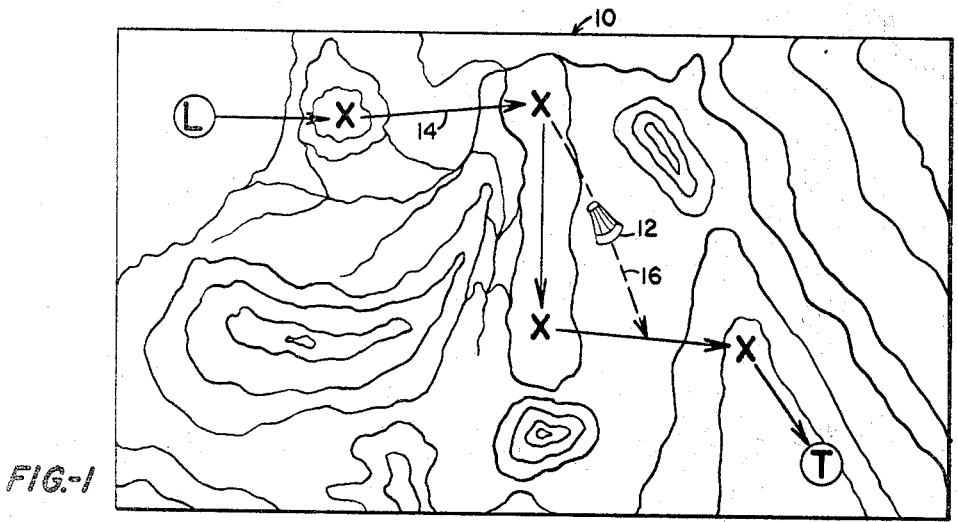
FIGURE 1 shows a map containing the mission established by spaced check points of a vehicle having a guidance system constructed according to the invention.

Referring to the drawing, there is shown in FIGURE 1 a map 10 having contour characteristics to indicate the terrain. The map shows the mission of a vehicle 12, such as an aircraft or missile, from the launching site L to the target T. The mission is along a flexible course in the direction of the arrows. The flight path 14 of the vehicle is determined by the spaced check points X. The check points are a series of separate reference maps obtained from previous reconnaissance flights or from simulated terrain maps. The interval between each check point may vary between a few hundred to several thousand miles depending on vehicle speed and the quality of the basic guidance system. The basic guidance system may be magnetic compass, dead reckoning, Doppler dead reckoning, radio command, inertial, or the like. The invention has been illustrated and will be described in conjunction with an inertial guidance system including an autopilot. The vehicle may perform preprogrammed maneuvers and evasive tactics between the check points.

The vehicle 12 is on a flight path 16 and is laterally spaced from the planned flight path 14. An intermittently ground referencing map matching guidance system combined with an inertial guidance system carried by the vehicle 12 corrects the position of the vehicle at each check point. The guidance systems include an autopilot or vehicle orientating mechanism to steer the vehicle back on the planned flight path 14. The vehicle is flown on inertial guidance signals between the check points. At the check points the map matching guidance system corrects the outputs of the inertial system.

Figure 2:
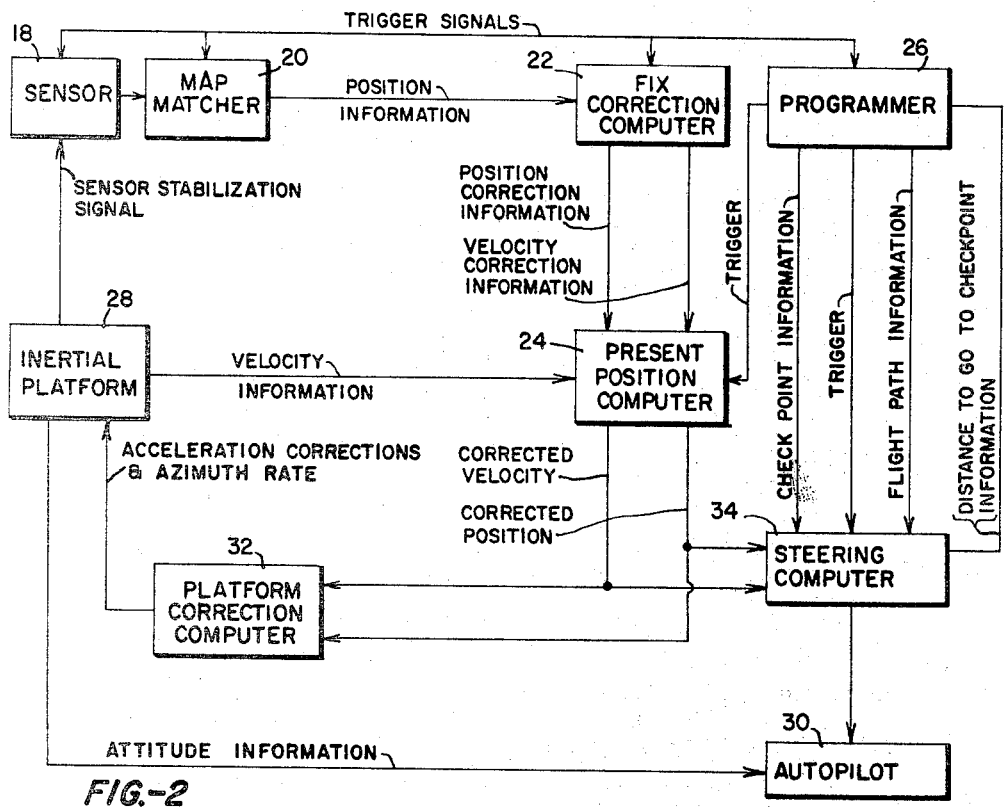
FIGURE 2 is a block diagram of a map matching guidance system coupled with an inertial guidance system.

Referring to FIGURE 2 there is shown a block diagram of the combined ground referencing map matching and inertial guidance systems. A sensor 18, such as a radar, optical, or infrared terrain recognizing device, is operative to form an information map of the terrain over which the vehicle is moving. The information determined by the sensor 18 is converted into signals which are fed into a map matcher 20. The map matcher may be either an area map matcher or a point by point map matcher. The map matcher 20 compares the map information from the sensor 18 with the reference map information at each check point. Output position information signals are produced by the map matcher 20 which are a function of the compared information. These signals are closely equivalent to the lateral and longitudinal position of the vehicle relative to the reference point.

A fix correction computer 22 receives the position information from the map matcher 20. The computer 22 generates position and possible velocity corrections which are fed to the present position computer 24. A detailed description of the fix correction computer follows the description of the combined guidance systems.

A programmer 26 stores the flight-path information including the calculated distances between check points and terrain characteristics of the mission. The programmer triggers the guidance system components at the check points in response to a comparison between the computed distance to the check point and the known distance between the check points.

The inertial platform 28 of the inertial guidance system is mounted on the vehicle, preferably close to its center of gravity. It contains accelerometers and is stabilized by gyroscopes. The instantaneous components of ground-speed are continuously available despite disturbances from winds, thrust fluctuations, and changes in angle of attack. The outputs of the inertial equipment are velocity components with respect to the earth's surface and vehicle attitude information (roll, pitch, and azimuth). The attitude information is fed into the sensor 18 for stabilization and into an autopilot 30 to control the vehicle's attitude.

Accelerometers, secured to the inertial platform, sense total acceleration with respect to inertial space, including centripetal and Coriolis accelerations. Corrections must be made to the actual accelerometer outputs to account for centripetal and Coriolis accelerations to obtain the true velocity with respect to the earth. The platform correction computer 32 feeds correction signals to the platform gyroscopes to compensate for the signals caused by the angular rate of the earth's rotation, the geographic latitude of the vehicle, and the radius of the earth in view of the velocity and position of the vehicle.

The inertial platform 28 as shown in FIGURE 2 would contain in addition to the basic platform the first integrators and suitable circuitry to provide Schuler tuned erection loops. Second integrations of each of the ground-speed components yield the two components of ground position. The orientation of the sensitive axis of the accelerometers in the horizontal may coincide with the "along track" and "across track" coordinates of a great circle, or may coincide with geographic north-south and east-west, thus allowing continuous generation of present latitude and longitude. The position obtained does not deteriorate in the presence of wind or similar disturbances encountered between successive fix points. This feature accounts for the greater distances between check points that may be utilized with the inertial aid guidance system.

The present position computer 24 would also receive inputs from the fix correction computer 22 which would correct its output for position and velocity errors. The position corrections would be introduced by feeding a fixed signal into the input of the present position integrator for a fixed time, while the velocity corrections would be introduced by applying a constant signal into the integrator.

The corrected position and velocity outputs from the present position computer 24 are fed into a steering computer 34. The steering computer 34 compares the present position coordinates with the stored destination coordinates of the next check point. The output signal resulting from the comparison defines steering commands to the autopilot 30 which steer the vehicle to the next check point. The steering computer 34 also feeds distance-to-go information to the programmer 26 to determine when the next fixing operation should be initiated.

The output signal of the map matcher, being a position with respect to each reference point, is used to correct the velocity and position correction output of the inertial system. The critical component for the tie-in of intermittent ground referencing guidance system with an inertial guidance system is a computer that periodically corrects the system output in accordance with ground referencing map matcher output. Because the function of this component is very similar to that of obtaining a navigation fix in a conventional aircraft or ocean vessel, it is referred to as a fix correction computer.

Figure 3:
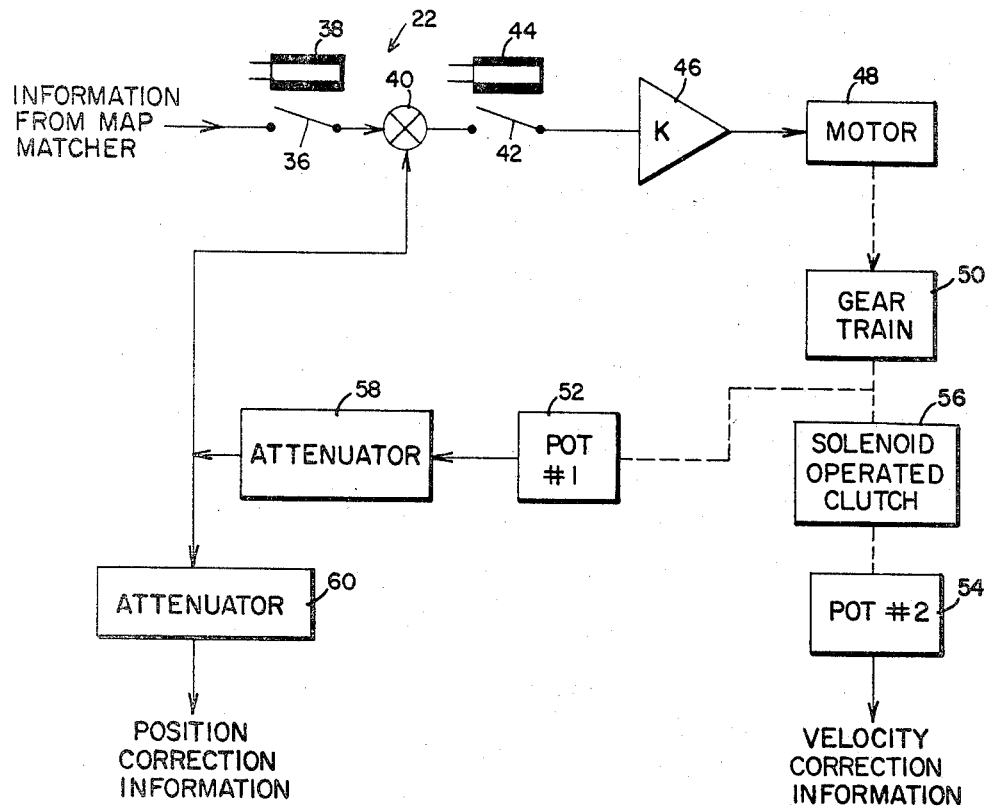
FIGURE 3 is a diagram of the computer which ties in the map matching guidance system with the inertial guidance system.

As shown in FIGURE 3, the fix correction computer 22 comprises a first switch 36 operated by relay 38 connected in series through a summation junction 40 with a second switch 42 operated by relay 44. An amplifier 46 augments the signals from the map matcher to energize the motor 48. The motor or servo 48 by means of a gear train 50 operates and resets a pair of potentiometers 52 (Pot #1) and 54 (Pot #2). A solenoid operated clutch 56 energized by the trigger circuit is positioned in the drive to potentiometer 54. The signal modified by potentiometer 54 is representative of velocity correction information. The signal from potentiometer 52 is controlled by attenuators 58 and 60 and is representative of position correction information.

The fix correction computer 22 or integrator is essentially a position servo with a solenoid-operated clutch and two potentiometers. A trigger circuit actuated by the map matcher disengages the clutch 44 and closes switch 44 momentarily before each map matcher operation. Switch 36 remains open. This action causes the servo motor to reset potentiometer 52. Subsequently the switches 36 and 42 are closed and the clutch 56 is energized by the trigger circuit during the time new input information is being supplied from the map matcher. The clutch drives potentiometer 54 by an amount proportional to the lateral error at the end of the interval divided by the interval distance. Potentiometer 54 is not reset at each check point therefore its total deflection is the summation of lateral interval errors divided by interval distances. Between check points the servo 48 is de-energized leaving the two potentiometers 52 and 54 in a fixed position.

The invention has been specifically described in conjunction with an inertial guidance system. However, the invention can be employed with other continuous navigation systems, such as, dead reckoning, Doppler navigation, etc., which provide positioning, velocity, and/or acceleration information. Additionally, the invention has been specifically described in connection with a radar map matcher. However, the invention can be employed with other position fixing systems, such as radio or optical systems.

While there have been shown, described, and pointed out the fundamental novel features of the invention as applied to the preferred embodiment, it will be understood that various omissions, substitutions, changes in form, and details of the guidance system illustrated may be made by those skilled in the art, without departing from the spirit of the invention.

What is claimed:
1. An automatic guidance system for controlling a vehicle in flight along a flexible course determined by spaced reference map check points comprising
   sensor means actuated only in the vicinity of the spaced reference map check points for recognizing terrain characteristics and converting said characteristics into map information,
   a map matcher actuated only in the vicinity of the spaced reference map check points connected to the sensor means to receive the map information, compare the map information with the reference map information, and to produce vehicle position information which is a function of the compared information,
   a programmer operable to store flight path information and trigger actuation of the map matcher and sensor means in the vicinity of each respective reference map check point,
   an inertial guidance system operable to continuously produce acceleration, and position information in response to vehicle motion for primary vehicle guidance information,
   computer means connected to the map matcher and the inertial guidance system operable at intermittent intervals upon receipt of information from the map matcher to correct the inertial guidance system output in accordance with the intermittent position information from the map matcher, and
   vehicle control means responsive to the output of the inertial guidance system to correct the course of the vehicle to conform with the course determined by the spaced reference map check points.

2. An automatic guidance system for controlling a vehicle in flight along a flexible course determined by spaced reference may check points comprising
   a map matching guidance system to produce vehicle position information relative to each respective reference map check point,
   an inertial guidance system continuously producing vehicle flight path information in response to vehicle motion, computer means connected to the map matching guidance system and inertial guidance system operable to sequentially at predetermined intervals correct the information from the inertial guidance system in accordance with the position information from the map matcher, and to trigger actuation of the map matching guidance system at the check points, and vehicle control means responsive to the output from the inertial guidance system to correct the course of the vehicle to conform with the course determined by the spaced reference map check points.

3. In an automatic guidance system for controlling a vehicle in flight along a flexible course determined by spaced reference map check points a map matching system intermittently operable to produce vehicle position information with respect to each respective check point, an inertial guidance system for the vehicle producing vehicle guidance information in response to vehicle motion, and computer means interconnecting the map matching system and inertial guidance system to intermittently correct the inertial guidance system in accordance with the position of the vehicle relative to each respective check point as determined by the map matcher, and to trigger actuation of the map matching system only at each successive check point.

4. An automatic guidance system for controlling a vehicle in flight along a flexible course determined by spaced reference map check points comprising sensor means for recognizing the terrain characteristics and converting said characteristics into map information, a map matcher connected to the sensor means to receive the map information, compare the map information with the reference map information, and to produce vehicle position information which is a function of the compared information, a programmer operable to trigger actuation of the sensor and map matcher periodically only at each successive check point, a basic guidance system for the vehicle operable on dead reckoning techniques to produce acceleration and position information in response to vehicle motion, computer means connected to the map matcher and the guidance system operable to correct the guidance system in accordance with the position information from the map matcher, and vehicle control means responsive to the guidance system to correct the course of the vehicle to conform with the course determined by the spaced reference map check points.

5. In a guidance system for controlling a vehicle in flight along a flexible course determined by spaced reference map check points the combination of a basic guidance system operable to produce guidance signal output information based on the predetermined relation of a respective reference map check point to the next successive reference map check point, vehicle control means responsive to the output of the basic guidance system to correct the course of the vehicle to conform with the course designated by the adjacent spaced reference map check points, sensor means actuated only in the vicinity of the spaced reference map check points for determining terrain information, a map matcher actuated only in the vicinity of the spaced reference map check points receiving the terrain information from the sensor to produce vehicle position information relative to the particular spaced reference map check point, a programmer operable to store flight path information and trigger actuation of the map matcher and sensor means in the vicinity of each respective reference map check point, and computer means operable at intermittent intervals upon receipt of information from the map matcher to correct the basic guidance system output in accordance with the intermittent position information from the map matcher.

6. A guidance system according to claim 5 where the basic guidance system is an inertial guidance system which operates strictly from predetermined reference information to effect guidance.

7. A guidance system according to claim 5 where the basic guidance system is a dead reckoning guidance system which operates from predetermined reference information to effect guidance.

References Cited

UNITED STATES PATENTS 2,884,540  4/1959  Shockley _____ 244—14 X
2,932,467  4/1960  Scorgie _____ 244—14

VERLIN R. PENDEGRASS, *Primary Examiner*.